Patented Apr. 22, 1941

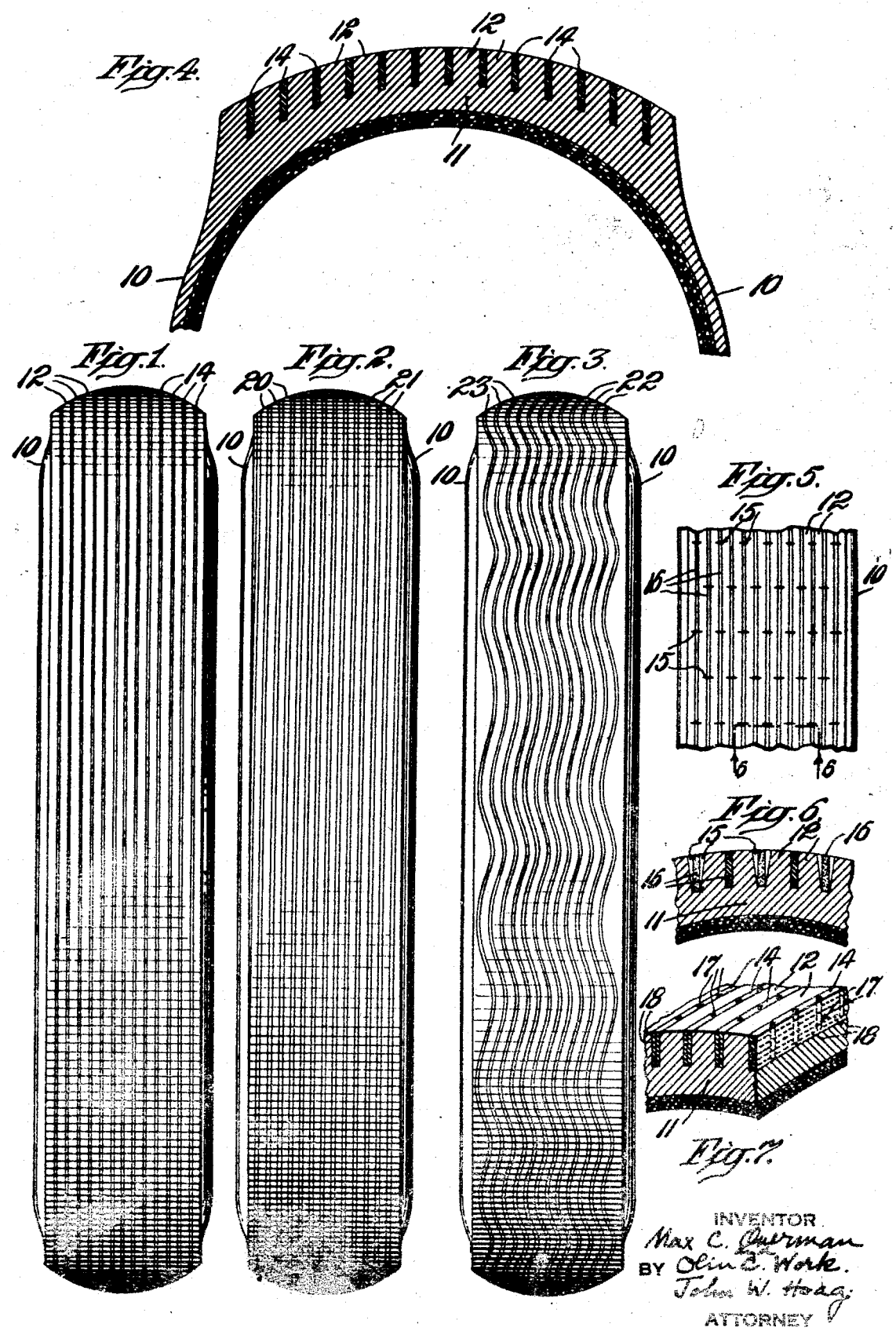

2,239,070

UNITED STATES PATENT OFFICE 2,239,070

NONSKID TIRE

Olin C. Work, Nutley, N. J., and Max C. Overman, New York, N. Y., assignors, by mesne assignments, to United States Rubber Company, New York, N. Y., a corporation of New Jersey Application June 16, 1938, Serial No. 214,118

4 Claims. (Cl. 152—211)

This invention relates to tires and aims to provide an improved nonskid tire.

Rough treads containing grooves or indentations of one sort or another have heretofore been used in efforts to decrease skidding. While some rough treads have proved fairly successful in reducing skidding, the grooves or cavities in these treads have introduced other disadvantages, including noise in operation, the danger of picking up pebbles or sharp loose objects on the road, and rapid and irregular wear.

We have discovered that it is possible to produce a highly effective nonskid tire having a smooth tread surface and thus entirely free from the disadvantages introduced by the rough treads of previous nonskid tires. A nonskid tire made in accordance with our invention has a laminated tread consisting of two different rubber compounds vulcanized together. The surface of the tread is smooth, but the different physical characteristics of the two rubber compounds used in making the laminated tread result in a deformation of the tread on frictional strains, which effectively prevents skidding on slippery surfaces such as wet or icy pavements.

The laminated tread of our new tire consists of alternating strips or layers of two different rubber compounds, the harder one of which is of the type ordinarily used in tire treads and is capable of an elongation of approximately 600 per cent. without breaking, while the softer one is of the type used in the common rubber band sold in stationery stores and is capable of an elongation of about 1100 per cent. without breaking. The laminations extend circumferentially around the tread of the tire, although they are not necessarily parallel to the median plane of the tire.

The effect of the different physical characteristics of the two rubber compounds used in our laminated tread is that, under frictional thrusts, the strips forming the laminated tread are deformed laterally, and, when in this position, effectively prevent skidding.

A specific embodiment of our invention is illustrated in the accompanying drawing in which:

Fig. 1 is a plan view of a tire showing one embodiment of our improved tread;

Fig. 2 is a view similar to Fig. 1 showing a modified tread;

Fig. 3 is a view similar to Fig. 1 showing a modified tread;

Fig. 4 is a section of a tire such as that illustrated in Fig. 1, 2 or 3 showing the part of the tire containing the tread;

Fig. 5 is a fragmentary plan view showing a further modification of our improved tread;

Fig. 6 is a fragmentary section showing the tread taken along the lines 6—6 of Fig. 5; and Fig. 7 is a fragmentary perspective view showing a modified form of strip material incorporated in the tread.

The tire illustrated in the drawing is provided with side walls 10 and a tread base 11. Strips 12 formed of one rubber compound and thinner strips 14 formed of another rubber compound are vulcanized to the tread base 11 and to each other and extend around the periphery of the tire to provide a laminated tread.

The tread base 11 and the strips 12 are formed of a rubber, similar to that used in ordinary tire treads at the present time, which may be elongated approximately 600 per cent. without breaking. The rubber of which the strips 14 are formed is much softer and more elastic than the rubber of strips 12 and is of the type used in the common rubber bands sold in stationery stores and may be elongated approximately 1100 per cent. without breaking.

The strips 12 and the strips 14 provide mutual lateral support which will prevent the crushing of those strips under very heavy loads, but the difference in the hardness and elasticity of the rubber forming strips 12 and the rubber forming strips 14 permits a lateral deformation of the different strips which is effective in the prevention of skidding, even though strips 12 and strips 14 extend to the periphery of the tire and provide the tread of the tire with a smooth surface. The strips 12 and 14 are preferably provided with parallel sides so that, as illustrated in Fig. 4, they are of uniform thickness, and the ability of the strips to become deformed laterally is not reduced as the tread becomes worn.

The tread illustrated in Fig. 1 is formed of strips 12 and 14 which are parallel to the median plane of the tire. The capacity of these strips to become deformed laterally is increased somewhat if they are disposed slightly across the path of travel of the tire. This is accomplished in the form of tread illustrated in Fig. 2 by forming strips 20, which are similar in composition to strips 12, and strips 21, which are similar in composition to strips 14, so that they diverge from the median plane of the tire through a small angle. A similar result is accomplished through the form of tread illustrated in Fig. 3, in which strips 22, which are of a composition similar to that of strips 12, and strips 23, which are of a composition similar to strips 14, follow a serpentine path around the tire.

The capacity of the strips to become deformed laterally may also be increased by providing the strips 14 with a series of transverse slits 15 which divide each of the strips 14 into a series of segments 16, as illustrated in Figs. 5 and 6. These segments 16 in adjacent strips 14 are preferably staggered with respect to each other.

The slits 15 of course disrupt the continuity of strips 14 at the point of cutting and said strips, therefore, offer no resistance to the sidewise bending of the strips 12 opposite the cuts. The strips 12 may, therefore, bend relatively sharply at the cuts. The extension of the cuts 15 part way into the strips 12, as shown in Figs. 5 and 6, reduces their inherent resistance to bending at the cuts and further increases their capacity for lateral deformation. It will be obvious that the more the strips 12 are deformed laterally the more directly are their edges presented against skidding in the direction of travel.

In the tread illustrated in Fig. 7, the highly elastic strips 14 are provided with a reinforcement which will increase the ability of those strips to withstand wear. A material which we have found to be well suited for this purpose consists of the fabric generally used in tire casings, which is known as "loose woven fabric." Such fabric is embedded in the highly elastic strips 14 with the heavy threads 17 radially disposed and the lighter threads 18 circumferentially disposed. The threads 18 are so fine that they are broken easily and do not prevent stretching of the strips 14.

What is claimed is:

1. A tire the tread portion of which comprises a plurality of circumferential ribs of wear-resisting tread rubber, the space between the ribs containing a soft elastic rubber, said soft elastic rubber being divided into segments.

2. A tire the tread portion of which comprises a plurality of circumferential ribs of wear-resisting tread rubber, the space between the ribs containing a soft elastic rubber, said soft elastic rubber being divided into segments by slits extending into the adjacent ribs.

3. A tire the tread portion of which comprises a plurality of circumferential ribs of wear-resisting tread rubber, the space between the ribs containing a soft elastic rubber, said soft elastic rubber being divided into segments, the segments being staggered transversely of the tread.

4. A tire the tread portion of which comprises a plurality of circumferential ribs of wear-resisting tread rubber, the space between the ribs containing a soft elastic rubber, said soft elastic rubber being divided into segments by slits extending into the adjacent ribs, the segments being staggered transversely of the tread.

OLIN C. WORK.
MAX C. OVERMAN.